United States Patent
Bonk et al.

(10) Patent No.: US 10,216,706 B1
(45) Date of Patent: Feb. 26, 2019

(54) METHOD AND COMPUTING DEVICE FOR FACILITATING DATA SAMPLE TESTING

(71) Applicant: WORKIVA INC., Ames, IA (US)

(72) Inventors: John Bonk, Ann Arbor, MI (US); Ryan Gilsdorf, Des Moines, IA (US); James Michael Morse, Adel, IA (US); Jason Aguilon, Louisville, CO (US); David Andrew Haila, Ames, IA (US); Matthew Sanders, Highlands Ranch, CO (US); Patrick Corwin Kujawa, Missoula, MT (US); Robert Reed Becker, Missoula, MT (US); Sean Martin Kelly Burke, Missoula, MT (US); Stephen Bush, Missoula, MT (US)

(73) Assignee: Workiva Inc., Ames, IA (US)

(*) Notice: Subject to any disclaimer, the term of this patent is extended or adjusted under 35 U.S.C. 154(b) by 0 days.

(21) Appl. No.: 15/681,960

(22) Filed: Aug. 21, 2017

(51) Int. Cl.
*G06F 17/30* (2006.01)
*G06F 7/00* (2006.01)
*G06F 17/18* (2006.01)
*G06F 17/16* (2006.01)
*G06F 3/0486* (2013.01)

(52) U.S. Cl.
CPC .......... *G06F 17/18* (2013.01); *G06F 3/0486* (2013.01); *G06F 17/16* (2013.01); *G06F 17/30958* (2013.01)

(58) Field of Classification Search
CPC ......... G06F 17/30958; G06F 17/30867; G06F 17/30961; G06F 17/30097
USPC ........................................................ 707/798
See application file for complete search history.

(56) References Cited

U.S. PATENT DOCUMENTS

| | | | | |
|---|---|---|---|---|
| 6,360,332 | B1* | 3/2002 | Weinberg | G06F 11/3664 714/38.13 |
| 2009/0303239 | A1* | 12/2009 | Ang | G06F 17/30554 345/440 |
| 2014/0289402 | A1* | 9/2014 | Moloian | G06F 11/3051 709/224 |
| 2016/0349969 | A1* | 12/2016 | Tallamy | G06F 17/3053 |
| 2017/0228437 | A1* | 8/2017 | Vora | G06F 17/30958 |

* cited by examiner

*Primary Examiner* — Usmaan Saeed
*Assistant Examiner* — Raquel Perez-Arroyo
(74) *Attorney, Agent, or Firm* — Drinker Biddle & Reath LLP

(57) ABSTRACT

A method for facilitating the testing of a data sample involves a computing device carrying out the following actions: displaying a data sample on a user interface; receiving, via the user interface, a selection of a test to be performed on the data sample; receiving, via the user interface, an input of a result of the test; generating, in a graph database, a vertex representing a visual indicator corresponding to the input result; and creating, in the graph database, an association between the vertex representing the visual indicator and a vertex representing a file containing the displayed data sample.

7 Claims, 23 Drawing Sheets

REQUESTS

New Request — 312

All Requests
General Population Sample

Phase [ 1 - Walkthrough ]  Year [ SOX 20... ▸ ]

ALL PBC REQUESTS

| TO SEND | REQUESTED | TO REVIEW | SAMPLE SELECTION TO SAMPLE | CONTROL TESTING TO TEST |
|---|---|---|---|---|
| 0 — 302 | 3 — 304 | 1 — 306 | 1 — 308 | 0 — 310 |

| TASK TITLE | DUE DATE | ASSIGNEE |
|---|---|---|
| ☐ Population Request C.AP01 | Jn 31 | Susan Browne |
| ☐ Population Request C.AP02 | Feb 4 | Jane Doe |
| ☐ Population Request C.AP03 | Feb 4 | Ed Harris |

Completed

FIG. 3

| Tasks | | | | Show: To Do ▶ |
|---|---|---|---|---|
| All Tasks | TITLE | DUE DATE ◂ | PREPARER | OWNER |
| My Tasks | 0  Population Request - C.AP01 | Sept 1 | Robert Jones | Susan Browne |
| My Created | 0  Population Request - C.AP04 | Sept 1 | Robert Jones | Susan Browne |
| | 0  Population Request - C.AP07 | Sept 1 | Robert Jones | Susan Browne |

FIG. 6

Population Request C.AP01

Requested by John Bonk on Jan 31

Population Request - C.AP01

Reference / Example Files

📄 1 File

Control Details

AR.AP01

[ Upload Files ] — 702

📄 1 File

Show All Files

Your Response

[ Please review and approve this list of checks ] — 704

[ Delegate Task ] — 706    [ Submit for Approval ] — 708

| Check ID | Descriptor | Date Issued | Signer | Amount |
|---|---|---|---|---|
| ck-001 | food | 5/1/2016 | John Hancock | 10,000.00 |
| ck-002 | and | 5/1/2016 | Curly-Fine | 10,000.00 |
| ck-003 | stuff | 5/1/2016 | Moe-Fine | 10,000.00 |
| ck-004 | food | 5/1/2016 | Larry-Fine | 10,000.00 |
| ck-005 | and | 5/1/2016 | Curly-Fine | 10,000.00 |
| ck-006 | stuff | 5/1/2016 | Moe-Fine | 10,000.00 |
| ck-007 | food | 5/1/2016 | Larry-Fine | 10,000.00 |
| ck-008 | and | 5/1/2016 | Curly-Fine | 10,000.00 |
| ck-009 | stuff | 5/1/2016 | Moe-Fine | 10,000.00 |
| ck-010 | food | 5/1/2016 | Larry-Fine | 10,000.00 |
| ck-011 | and | 5/1/2016 | Curly-Fine | 10,000.00 |
| ck-012 | stuff | 5/1/2016 | Moe-Fine | 10,000.00 |
| ck-001 | food | 5/1/2016 | Larry-Fine | 10,000.00 |
| ck-002 | and | 5/1/2016 | Curly-Fine | 10,000.00 |
| ck-003 | stuff | 5/1/2016 | Moe-Fine | 10,000.00 |
| ck-004 | food | 5/1/2016 | Larry-Fine | 10,000.00 |
| ck-005 | and | 5/1/2016 | Curly-Fine | 10,000.00 |
| ck-006 | stuff | 5/1/2016 | Moe-Fine | 10,000.00 |
| ck-007 | food | 5/1/2016 | Larry-Fine | 10,000.00 |
| ck-008 | and | 5/1/2016 | Curly-Fine | 10,000.00 |
| ck-009 | stuff | 5/1/2016 | Moe-Fine | 10,000.00 |
| ck-010 | food | 5/1/2016 | Larry-Fine | 10,000.00 |
| ck-011 | and | 5/1/2016 | Curly-Fine | 10,000.00 |
| ck-012 | stuff | 5/1/2016 | Moe-Fine | 10,000.00 |

Select From [list_of_checks.csv ▼] [10 ⇕] of 24 Rows [Randomize] [Import Selection]

| Check ID | Description | Date Issued | Signer | Amount |
|---|---|---|---|---|
| ck-001 | food | 2016-05-01 | John Hancock | 10,000.00 |
| ck-002 | and | 2016-05-01 | Curly-Fine | 10,000.00 |
| ck-003 | stuff | 2016-05-01 | Moe-Fine | 10,000.00 |
| ck-004 | food | 2016-05-01 | Larry-Fine | 10,000.00 |
| ck-005 | and | 2016-05-01 | Curly-Fine | 10,000.00 |
| ck-006 | stuff | 2016-05-01 | Moe-Fine | 10,000.00 |
| ck-007 | food | 2016-05-01 | Larry-Fine | 10,000.00 |
| ck-008 | and | 2016-05-01 | Curly-Fine | 10,000.00 |
| ck-009 | stuff | 2016-05-01 | Moe-Fine | 10,000.00 |
| ck-010 | food | 2016-05-01 | Larry-Fine | 10,000.00 |
| ck-011 | and | 2016-05-01 | Curly-Fine | 10,000.00 |
| ck-012 | stuff | 2016-05-01 | Moe-Fine | 10,000.00 |
| ck-001 | food | 2016-05-01 | Larry-Fine | 10,000.00 |
| ck-002 | and | 2016-05-01 | Curly-Fine | 10,000.00 |
| ck-003 | stuff | 2016-05-01 | Moe-Fine | 10,000.00 |
| ck-004 | food | 2016-05-01 | Larry-Fine | 10,000.00 |
| ck-005 | and | 2016-05-01 | Curly-Fine | 10,000.00 |
| ck-006 | stuff | 2016-05-01 | Moe-Fine | 10,000.00 |
| ck-007 | food | 2016-05-01 | Larry-Fine | 10,000.00 |
| ck-008 | and | 2016-05-01 | Curly-Fine | 10,000.00 |
| ck-009 | stuff | 2016-05-01 | Moe-Fine | 10,000.00 |
| ck-010 | food | 2016-05-01 | Larry-Fine | 10,000.00 |
| ck-011 | and | 2016-05-01 | Curly-Fine | 10,000.00 |
| ck-012 | stuff | 2016-05-01 | Moe-Fine | 10,000.00 |

FIG. 12A

| Select From | list_of_checks.csv | 5 | of 24 Rows | Reset | Import Selection | |
|---|---|---|---|---|---|---|
| | Check ID | Description | | Date Issued | Signer | Amount |
| ▶ | ck-003 | stuff | | 2016-05-01 | John Hancock | 10,000.00 |
| ▶ | ck-009 | stuff | | 2016-05-01 | Moe-Fine | 10,000.00 |
| ▶ | ck-011 | and | | 2016-05-01 | Curly-Fine | 10,000.00 |
| ▶ | ck-001 | food | | 2016-05-01 | Larry-Fine | 10,000.00 |
| ▶ | ck-007 | food | | 2016-05-01 | Larry-Fine | 10,000.00 |

OVERVIEW  1 - Walkthrough  3 - Roll Forward

Completion Date Select date
Conclusion Enter text
Total Sample Size Enter number
Allowable Exceptions Enter number
Requires a population Select Population Required
Test effectiveness Select Test Effectiveness
Testing technique Select Testing Technique
Test in program SOX 2017
Exposes issue Select issue
Test Phases C.AP01– SOX 2017

TEST STEPS / ATTRIBUTES

| Order | Test Step | Test Step Description | Attribute | Attribute Name | Attribute Description | Test? |
|---|---|---|---|---|---|---|
| 1 | Confirm Check Details | Confirm that all check details match expected control parameters | A | Examine Date | Confirm disbursement date | ✓ |
| | | | B | Examine Signature | Confirm 2 executive signatures | ✓ |

| Export | Add Test Phrase | | Comments | | Start Testing | | |
|---|---|---|---|---|---|---|---|

Overview    1 - Walkthrough    3 - Roll Forward

REQUESTS

| Request ID | Request Type | Request Due | Request Status | Request Description | Request Provider | Uploaded Files |
|---|---|---|---|---|---|---|
| Population request - AR.AP.3 | Population | 02-04-2017 | Completed | This is a demo Population Request description | John Bonk | 📄(1) |

[New PBC Request]

ATTRIBUTE TESTING

| | CHECK ID | DESCRIPTION | DATE ISSUED | SIGNER | AMOUNT | FILES |
|---|---|---|---|---|---|---|
| 1 | ck-002 | stuff | 2016-05-01 | John Hancock | 10,000.00 | 📄(0) |
| 2 | ck-009 | stuff | 2016-05-01 | Moe-Fine | 10,000.00 | 📄(0) |
| 3 | ck-011 | and | 2016-05-01 | Curly-Fine | 10,000.00 | 📄(0) |
| 4 | ck-001 | food | 2016-05-01 | Larry-Fine | 10,000.00 | 📄(0) |
| 5 | ck-007 | food | 2016-05-01 | Larry-Fine | 10,000.00 | 📄(0) |

⎯ 1302

[Add Samples to Matrix]    [New Sample Request]

FOOTNOTES

[Add Footnote]

CONCLUSIONS

| Export | Comments | | | | | |
|---|---|---|---|---|---|---|
| | | Start Testing | | | | |
| Overview | 1 - Walkthrough | 2 - Interim | 3 - Roll Forward | | | |
| Population Request - C.AP01 | Population | 01-28-2017 | Competed | Please provide a list of all checks written over $10,000 | John Bonk | 🗎(1) |
| Population Request - C.AP03 | Population | 01-30-2017 | Competed | Please provide a list of all checks written over $10,000 | John Bonk | 🗎(1) |
| Sample Request - C.AP01 | Sample | 01-26-2017 | Competed | Please provide check evidence | John Bonk | 🗎(2) |

New PBC Request

ATTRIBUTE TESTING

| | Check ID | Description | Date Issued | Signer | Amount | Files | 1-A | 2-B | 3-Attr-X | 3-C |
|---|---|---|---|---|---|---|---|---|---|---|
| 1 | ck-003 | and | 2016-05-01 | Curly-Fine | 10,000.00 | 🗎(1) | ⊘ | ⊗¹,² | | |
| 2 | ck-009 | and | 2016-05-01 | Curly-Fine | 10,000.00 | 🗎(1) | N/A | ⊘ | | |
| 3 | ck-011 | food | 2016-05-01 | Larry-Fine | 10,000.00 | 🗎(0) | | | | |
| 4 | ck-001 | and | 2016-05-01 | Curly-Fine | 10,000.00 | 🗎(0) | | | | |
| 5 | ck-007 | stuff | 2016-05-01 | Moe-Fine | 10,000.00 | 🗎(0) | | | | |

Add Samples to Matrix    New Sample Request

| Request Samples* | | Check ID | Description | Date Issued | Signer | Amount |
|---|---|---|---|---|---|---|
| ☐ | | | | | | |
| ☑ | 1 | ck-003 | and | 2016-05-01 | Curly-Fine | 10,000.00 |
| ☑ | 2 | ck-009 | stuff | 2016-05-01 | Moe-Fine | 10,000.00 |
| ☑ | 3 | ck-011 | food | 2016-05-01 | Larry-Fine | 10,000.00 |
| ☑ | 4 | ck-001 | food | 2016-05-01 | Larry-Fine | 10,000.00 |
| ☑ | 5 | ck-007 | and | 2016-05-01 | Curly-Fine | 10,000.00 |

Request Title* [Sample Request] — 1402

Request Due* [2/4/2017] — 1404

Request Instructions* [Please provide specific check evidence] — 1406

Requested By* [- Select - ▼]

Provided By* [Adele Volkman ▼]

Reference Files [0 Upload Files] — 1408

[Cancel] [Create Request] — 1410

Sample Request C.AP01 – due Feb. 4
Please provide specific check evidence

Prepared by John Bonk on Jan 31

Your Response
Complete by uploading supporting files.
Click to upload or drag files to each row.

Reference / Example Files
🗎 1 File
Control Details
C.AP01

Add Additional Info

| CHECK ID | DESCRIPTION | DATE ISSUED | SIGNER | AMOUNT | UPLOADED FILES |
|---|---|---|---|---|---|
| ck-003 | and | 2016-05-01 | Curly Fine | 10,000.00 | 🗎 1 File |
| ck-009 | stuff | 2016-05-01 | Moe-Fine | 10,000.00 | 🗎 2 Files |
| ck-011 | food | 2016-05-01 | Larry-Fine | 10,000.00 | 🗎 1 File |
| ck-001 | food | 2016-05-01 | Larry-Fine | 10,000.00 | 🗎 1 File |
| ck-007 | and | 2016-05-01 | Curly-Fine | 10,000.00 | 🗎 1 File |

—1502

[ Delegate Task ]   [ Submit for Approval ]
       1504                    1506

REQUESTS

[ New Request ]

| | Phase | 1 - Walkthrough ▼ | Year | SOX 20... ▼ |

All Requests
General
Population
Sample

SAMPLE REQUESTS

| TO SEND | REQUESTED | TO REVIEW | CONTROL TESTING |
|---|---|---|---|
| 0 ⊙ ⌒ 302 | 0 ⊙ ⌒ 304 | 1 ⊙ ⌒ 306 | TO TEST 0 ⊙ ⌒ 308 |

| TASK TITLE | DUE DATE | ASSIGNEE |
|---|---|---|
| ▪ Review "Sample Request C.AP01"<br>⌐ 1602 | Feb 4 | John Bonk |

Completed

METHOD AND COMPUTING DEVICE FOR FACILITATING DATA SAMPLE TESTING

TECHNICAL FIELD

The disclosure relates generally to data testing and, more particularly, to a method and computing device for facilitating data sample testing.

BACKGROUND

Data testing techniques are used in many different applications, including scientific research, software development, and in business. For example, there are laws and regulations (such as Sarbanes-Oxley ("SOX")) that require companies to test their financial controls periodically. One of the challenges in data testing is gathering and managing the data to be tested, particularly when the data is spread throughout an organization.

DRAWINGS

While the appended claims set forth the features of the present techniques with particularity, these techniques may be best understood from the following detailed description taken in conjunction with the accompanying drawings of which:

FIG. 3 illustrates a user interface, according to an embodiment.

FIGS. 5-9 illustrate user interfaces according to various embodiments.

FIG. 10 illustrates a spreadsheet that may be used as an input to control testing process, according to an embodiment.

FIG. 11, FIG. 12A, FIG. 12B, FIG. 13A, FIG. 13B, FIG. 13C, FIG. 14, FIG. 15, FIG. 16, FIG. 17, FIG. 18A and FIG. 18B illustrate user interfaces according to various embodiments.

DESCRIPTION

The disclosure is generally directed to a method for facilitating data sample testing. In an embodiment, the method involves a computing device carrying out the following actions: displaying a data sample on a user interface; receiving, via the user interface, a selection of a test to be performed on the data sample; receiving, via the user interface, an input of a result of the test; generating, in a graph database, a vertex representing a visual indicator corresponding to the input result; and creating, in the graph database, an association between the vertex representing the visual indicator and a vertex representing a file containing the displayed data sample.

According an embodiment, a method for facilitating data sample testing involves a computing device carrying out the following actions: receiving an input of a plurality of data samples, each of the plurality of samples having a plurality of attributes that are to be tested; generating a matrix of the plurality of samples and the plurality of attributes; displaying a visual representation of the matrix on a user interface; visually rendering a data sample of the plurality of samples on the user interface; detecting a user interaction with a data sample as rendered on the user interface, wherein the user interaction indicates a result of a test on the data sample; and, updating the graph database with a vertex representing the result, wherein the vertex representing the result is associated in the graph database with a vertex representing the data sample.

In an embodiment, a method for facilitating the testing of the content of a document involves a computing device carrying out the following actions: visually rendering a document; receiving, at a location on the visual rendition of the document, a user input indicating a result of a test; displaying a markup on the visual rendition at the location, wherein the markup visually indicates a result of the test; generating, in a graph database, a vertex representing the markup; associating the vertex representing the markup with a vertex representing the document; and associating the vertex representing the markup with a vertex representing the result of the test.

Figure 1:
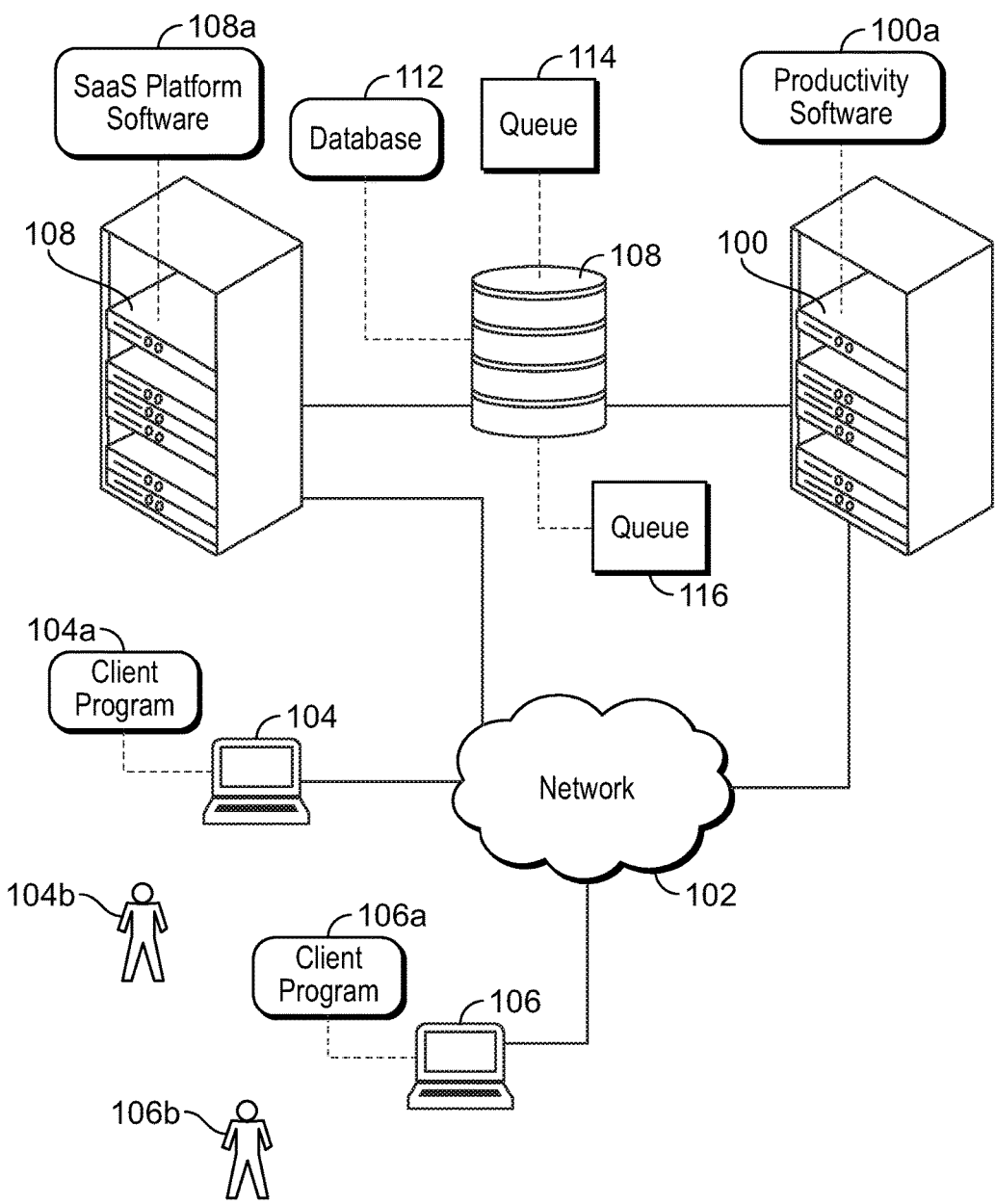
FIG. 1 is a block diagram illustrating an example networking environment in which various embodiments of the disclosure may be employed.

Various embodiments of the disclosure are implemented in a computer networking environment. Turning to FIG. 1, an example of such an environment is shown. A first computing device 100 (e.g., a hardware server or a cluster of hardware servers) is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 (e.g., a client device), a third computing device 106 (e.g., a client device), and a fourth computing device 108 (e.g., a hardware server or a cluster of hardware servers).

It is to be understood that various embodiments may be carried out on the first computing device 100, the second computing device 104, the third computing device 106, or other computing devices not depicted, with one or both the second computing device 104 and the third computing device 106 accessing the first computing device 100 via client programs (labeled 104a and 106a, respectively), such as thin, web-based clients. In an embodiment, the first computing device 100 executes productivity software 100a (e.g., a document editing application, a spreadsheet application, etc.) and the third computing device 108 executes software-as-a-service ("SaaS") platform software 108a. The first computing device 100 and the third computing device 108 are communicatively linked to a media storage device 110 (e.g., a memory or a redundant array of independent disks). Although FIG. 1 depicts the media storage device 110 as a single device, in fact, the media storage device 110 may be implemented as a single computing device or as multiple computing devices working together, and may represent a cloud storage service including multiple storage devices.

In another embodiment, the productivity software 100a and the SaaS platform software 108a execute on the same computing device (e.g., the first computing device 100 or the third computing device 108). For example, the productivity software 100a could reside on one partition of the first computing device 100 while the SaaS platform software 108a could reside on another partition of the first computing device 100. In other embodiments, portions of the productivity software 100a execute on both the first computing device 100 and the third computing device 106, and/or portions of the SaaS platform software 108a may be executed on both the first computing device 100 and the third computing device 108. With such network configurations, the second computing device 104 and the third computing device 106 are configured to access the computing device or devices on which the productivity software 100*a* resides.

Although there may be many types of data stored on the media storage device 110, the present disclosure will focus on a graph database 112, which is maintained by the SaaS platform software 108*a*, but whose operations are controlled by the productivity software 100*a*, which issues instructions to read from, write to, and modify the contents of the graph database 112 via the SaaS platform software 108*a*. Also discussed in this disclosure are a first task queue 114 and a second task queue 116, whose functions will be described below in more detail.

Figure 2:
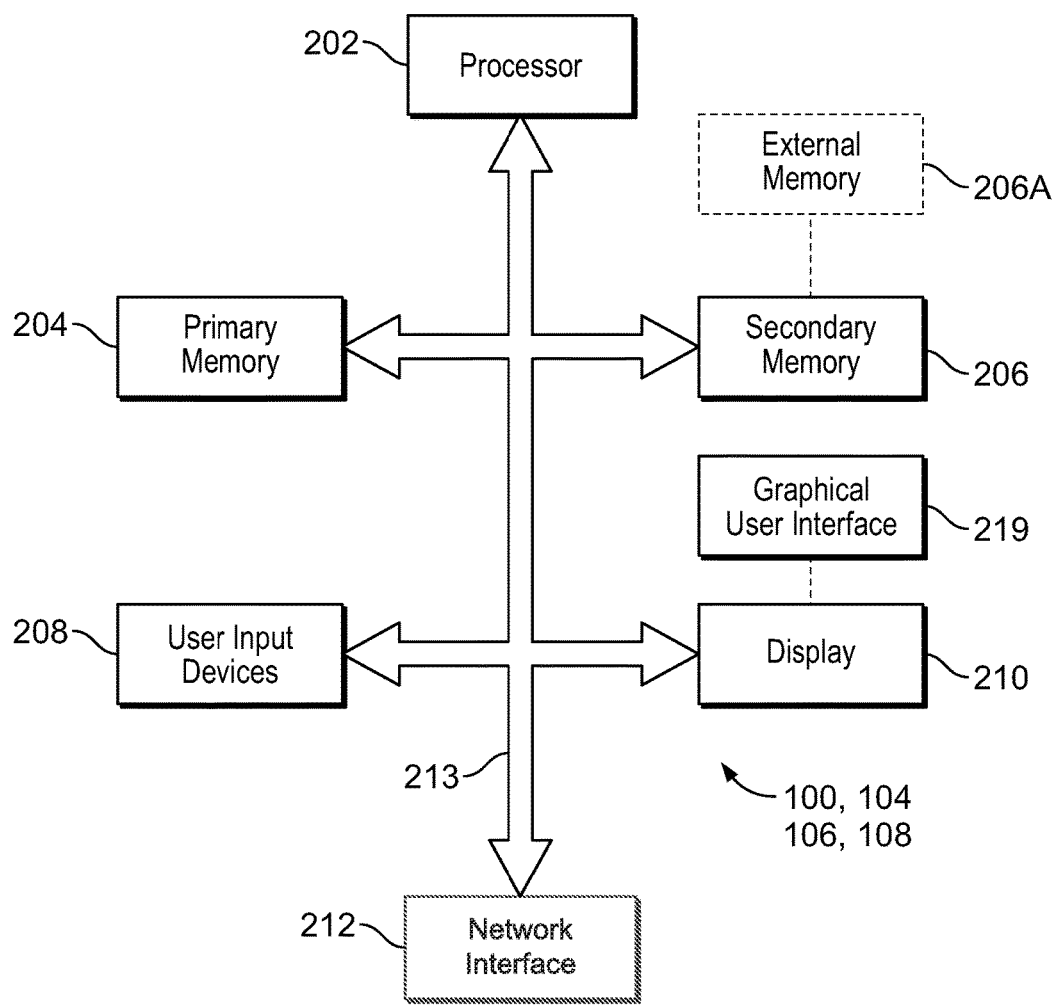
FIG. 2 is a block diagram of a computing device, according to an embodiment.

In one implementation, one or more of the computing devices of FIG. 1 (including the media storage device 108) have the general architecture shown in FIG. 2. The computing device of FIG. 2 includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

The memories 204 and 206 store instructions executable by the processor 202 and data. The term "local memory" as used herein refers to one or both the memories 204 and 206 (i.e., memory accessible by the processor 202 within the computing device). In some embodiments, the secondary memory 206 is implemented as, or supplemented by an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

This disclosure will sometimes refer to one or more of the client program 104*a*, the client program 106*a*, and the productivity software 100*a* as taking one or more actions. It is to be understood that such actions may involve only one of these software entities or may involve two or more. Possible ways that one or more of these programs could take an action include: (a) the client program transmitting hypertext transport protocol commands such as "Get" and "Post" in order to transmit to or receive information from the productivity software 100*a* (e.g., via a web server), (b) the client program running a script (e.g., JavaScript) to send information to and retrieve information from the productivity software 100*a*, and (c) the client program (e.g., a web browser) receiving an entry of a uniform resource locator (e.g., as result of a user selection of a link in a received email), being directed to a web-based portal, providing input to the productivity software 100*a* via the portal, and receiving output from the productivity software 100*a* via the portal. The productivity software 100*a* may ultimately obtain information (e.g., web pages or data to feed into plugins used by the client programs) from the graph database 112 or the SaaS platform software 108*a*).

According to an embodiment, the productivity software 100*a* is able to manage tasks for various users through the use of the queues 114 and 118. Users are able to view and manage tasks in their respective queues through user interfaces. In one use case, the productivity software 100*a* provides a platform that allows an organization to carry out a test of controls for the purpose of complying with SOX rules. The examples that follow will incorporate this use case, and it will be assumed for the sake of illustration that: the user 104*b* is acting in the role of a requester (and will also be referred to as the requester 104*b*), the user 106*b* is acting in the role of a provider (and will also be referred to as the provider 106*b*), that the first queue 114 holds tasks for the requester 104*b*, and the second queue 116 holds tasks for the provider 106*b*. Furthermore, when the disclosure refers to the requester 104*b* or provider 106*b* as carrying out an action, the actions are, in fact, carried out by the productivity software 100*a* based on input from one or both of the client programs 104*a* and 106*a* (which may have received input from the requester 104*b* and provider 106*b*, respectively). In the SOX testing use case, the requester 104*b* would typically be the tester and the provider 106*b* would typically be the control owner. It should also be understood, that the various techniques described herein are applicable to many other use cases besides SOX testing.

In an embodiment, the primary user interface that the requester 104*b* interacts with (e.g., via the client program 104*a*) is in the form of a dashboard, an example of which is shown in FIG. 3. The dashboard, generally labeled 300, acts as home screen for the requester 104*b*. The dashboard 300 organizes the tasks of the first queue 114 (the task queue for the requester 104*b*) by task type, each of which can be accessed through tabs. The tabs include: (a) "To Send" tab 302, which lists the requests that have been created but not sent, (b) "Requested" tab 304, which lists the requests (both population requests and evidence requests) that have been sent out but for which no response has been received, (c) "To Review" tab 306, which lists the requests (population and evidence) for which responses have been received and therefore need to be reviewed by the requester 104*b*, (d) "To Sample" tab 308, which lists the populations that the requester 104*b* has reviewed and approved and are therefore ready to be sampled, and (e) "To Test" tab 310, which lists evidence sets (received from the provider 106*b* or delegatee of the provider 106*b*) waiting to be tested.

Figure 4A:
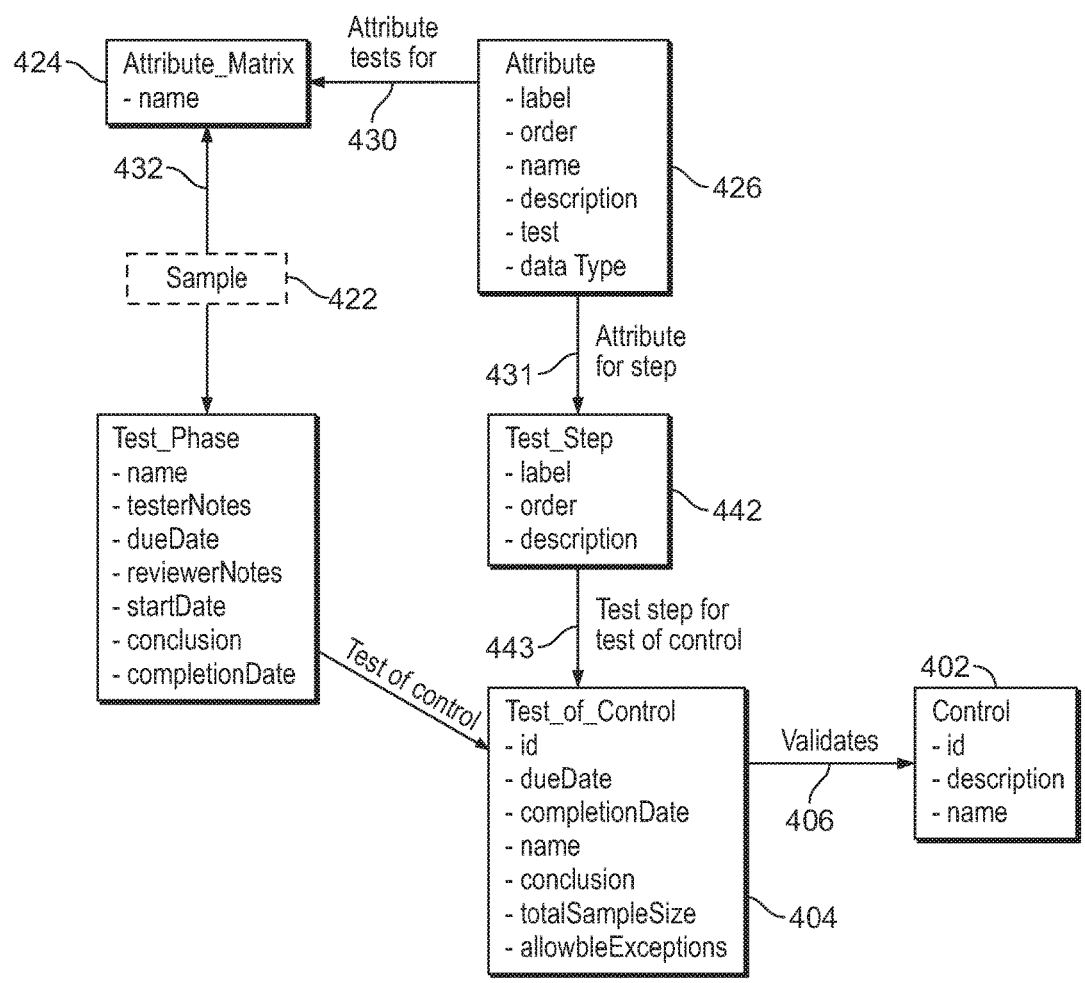
FIG. 4A and FIG. 4B are block diagrams illustrating data structures within a graph database, according to an embodiment.
Figure 4B:
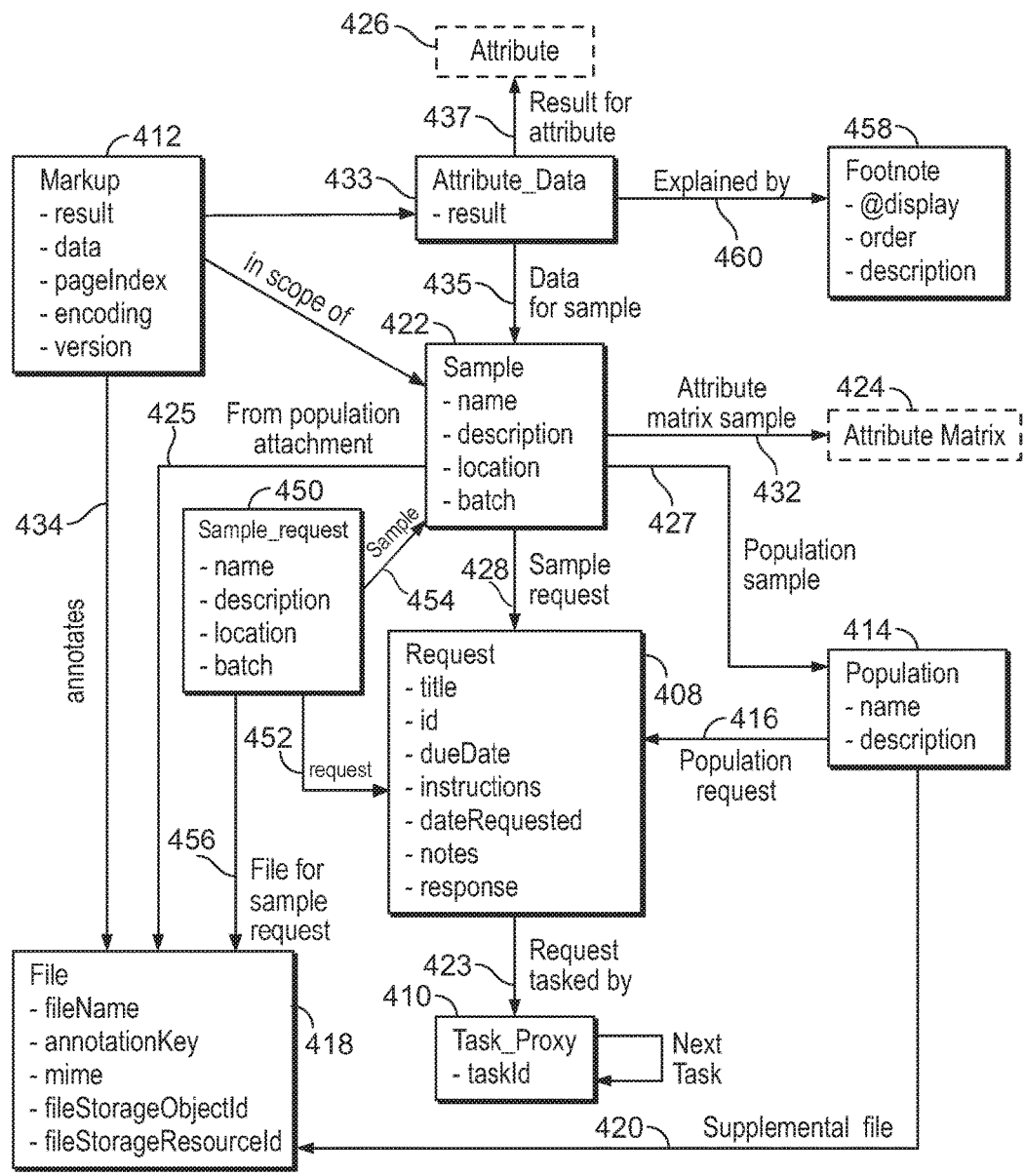

According to an embodiment, the productivity software 100*a* creates and updates vertices and edges in the graph database 112 to represent and organize the various requests, populations, data samples, tests, and supporting documents needed for an organization to carry out data tests. Examples of the data structures (vertices and edges) used in this capacity (in an embodiment) are depicted in FIG. 4A and FIG. 4B. Each vertex has at least one property, and the relationship between two given vertices (if there is a relationship) is defined in the graph database 112 by at least one edge. Vertices and edges may be created by the productivity software 100*a* (such as during an onboarding process for a customer) or by a user of the productivity software 100*a*. For example, the productivity software 100*a* might receive a spreadsheet with a list of SOX controls (e.g., "Control C.AP01, Control C.AP03," etc.)

The vertices include one or more control vertices 402, each of which includes properties that describe a control (e.g., in the SOX context), and one or more test of control vertices 404, each of which includes properties that describe a test that may be performed on a particular control. A relationship between a test of control vertex 404 and the control vertex 402 representing the control that the test validates is defined in the database 112 by an edge 406. The remaining vertices will be described as being created during example interactions between the first client program 104a and the productivity software 100a.

For example, to create a new request for a population, the requester 104b selects the "New Request" button 312 on the dashboard 300. In response, the productivity software 100a provides a user interface through which the requester 104b can enter basic information about the test for which the population is requested, such as identifying the relevant test being performed and the test phase to which the test applies. Once the requester 104b has entered that data, the productivity software 100a creates a request vertex 408 (FIG. 4B) that includes properties regarding the population request, a task proxy vertex 410 to interface with a tasking function of the productivity software 100a, and an edge 423 from the request vertex 408 to the task proxy vertex 410.

Figure 5:

According to an embodiment, productivity software 100a notifies the provider of the pending request. The requester may also provide the productivity software 100a with a message that is to be sent to the provider along with the notification. The notification can take the form of, for example, a text message, an alert from a mobile app, or an email. For example, referring to FIG. 5, in an embodiment, the productivity software 100a displays a user interface 500 that allows the requester 104b to select a provider 106b to fulfill the request and to compose an email to the provider 106b.

In an embodiment, once the requester 104b has finalized the text of the email (e.g., indicating this via a "send" button), the productivity software 100a responds by sending out the email to the provider 106b (or providers if there are multiple) and adding a "population request" task to the provider's queue 116. The email contains a link to a portal capable of interacting with the productivity software 100a, so that when the provider 106b receives the email, opens it, and activates the link, the client program 106a is directed to the portal, a user interface of which is shown in FIG. 6. The user interface 600 displays the requests (shown in FIG. 6 as part of a list 602) that are in currently in the queue 116. When the provider 106b selects a request (the request 604, in this example), the productivity software 100a responds by transmitting a file upload interface 700 to the computing device 104 (FIG. 7). The file upload interface 700 includes instructions from the requester 104b, a description of the control being tested (which the productivity software 100a pulls from the control vertex 402 (FIG. 4A) of the graph database 112), on-screen button 702 for initiating file uploads, and a text entry area 704 where the provider 106b can add comments for the requester 104b. Additionally, the provider 106b can delegate the task of providing the population (e.g., fulfilling the population request) to someone else via the "Delegate Task" button 706, in which case the productivity software 100a will generate an email to whomever the provider 106b identifies and place the appropriate task in the delegatee's queue. Once the provider 106b uploads the population (e.g., in the form of a spreadsheet or comma-separated value ("csv") file) and selects the "Submit for Approval" button 708, the productivity software 100a adds the task (C.AP01 in this case) to the requester's queue 116. Additionally, the productivity software 100a creates a population vertex 414 (FIG. 4B) in the database 112, a file vertex 418 for each file (e.g., each csv file) that the provider 106b provides in response to the request, and an edge 420 from the population vertex 414 to the file vertex 418. The file vertex 418 includes one or more properties (such as a unique object identifier) sufficient for the productivity software 100a to locate the file in the media storage device 110.

Figure 8:
Figure 9:
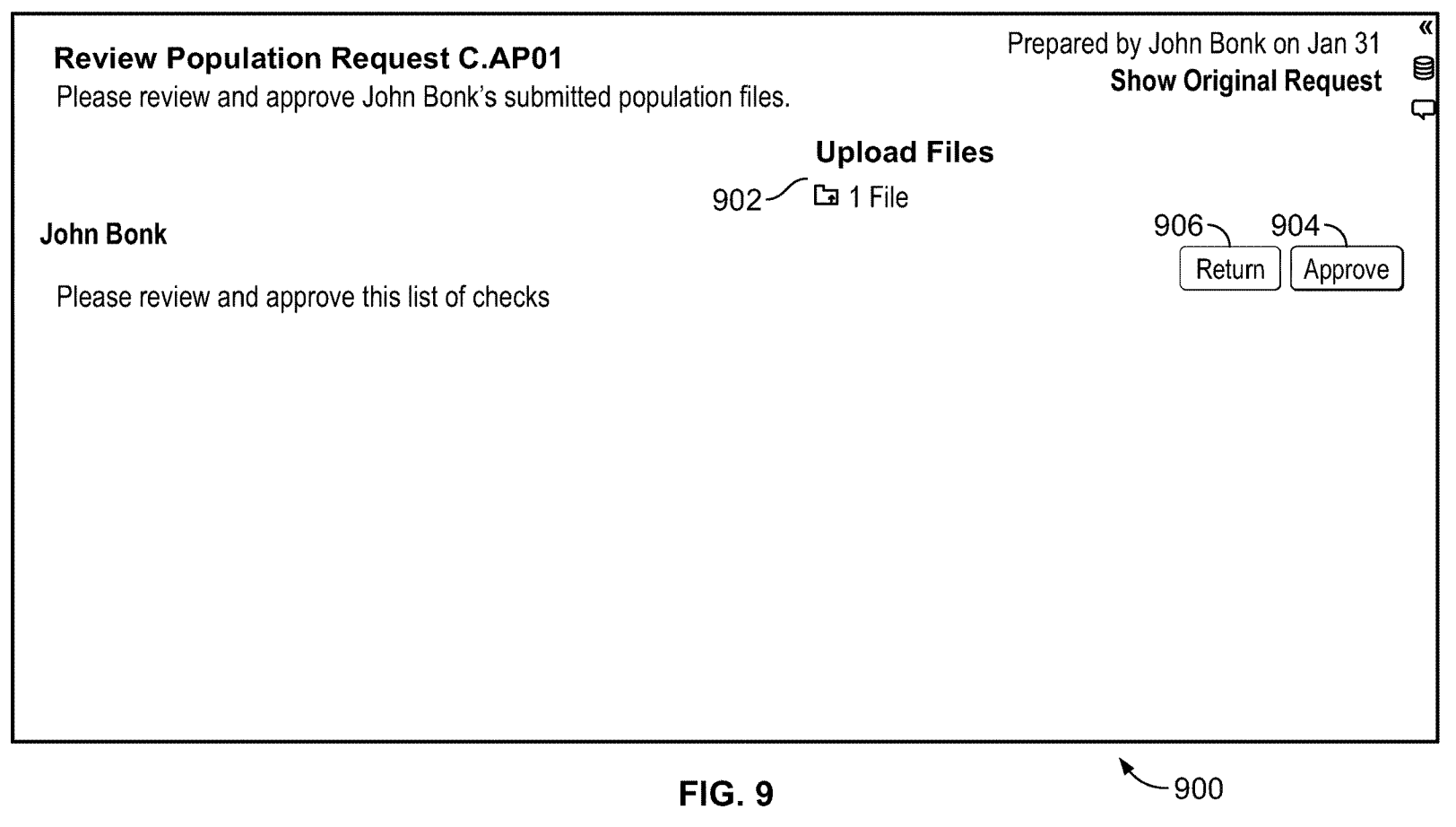

According to an embodiment, to review a submitted population, the requester 104b selects the "To Review" tab 306 on the dashboard 300 (FIG. 8) and selects the population (entry 802, in this example). In response, the productivity software 100a provides a user interface 900, as shown in FIG. 9. The user interface 900 includes an attachment pane containing links to the file or files that the provider 106b uploaded in response to the population request. The requester 104b can select one or more files as needed in order to open them and make sure that received populations are appropriate. For example, if the received population is in the form of a csv file and the requester 104b selects the file 902 in the attachment pane, the productivity software 101a responds by providing a user interface 1000, which shows the contents of the csv file (FIG. 10). If the requester 104b finds the received populations appropriate, the requester 104b can accept the population(s) (e.g., via the "Approve" button 904), or return the population(s) (via the "Return" button 906) back to the provider 106b along with a note explaining the reasons for the return.

Figure 11:
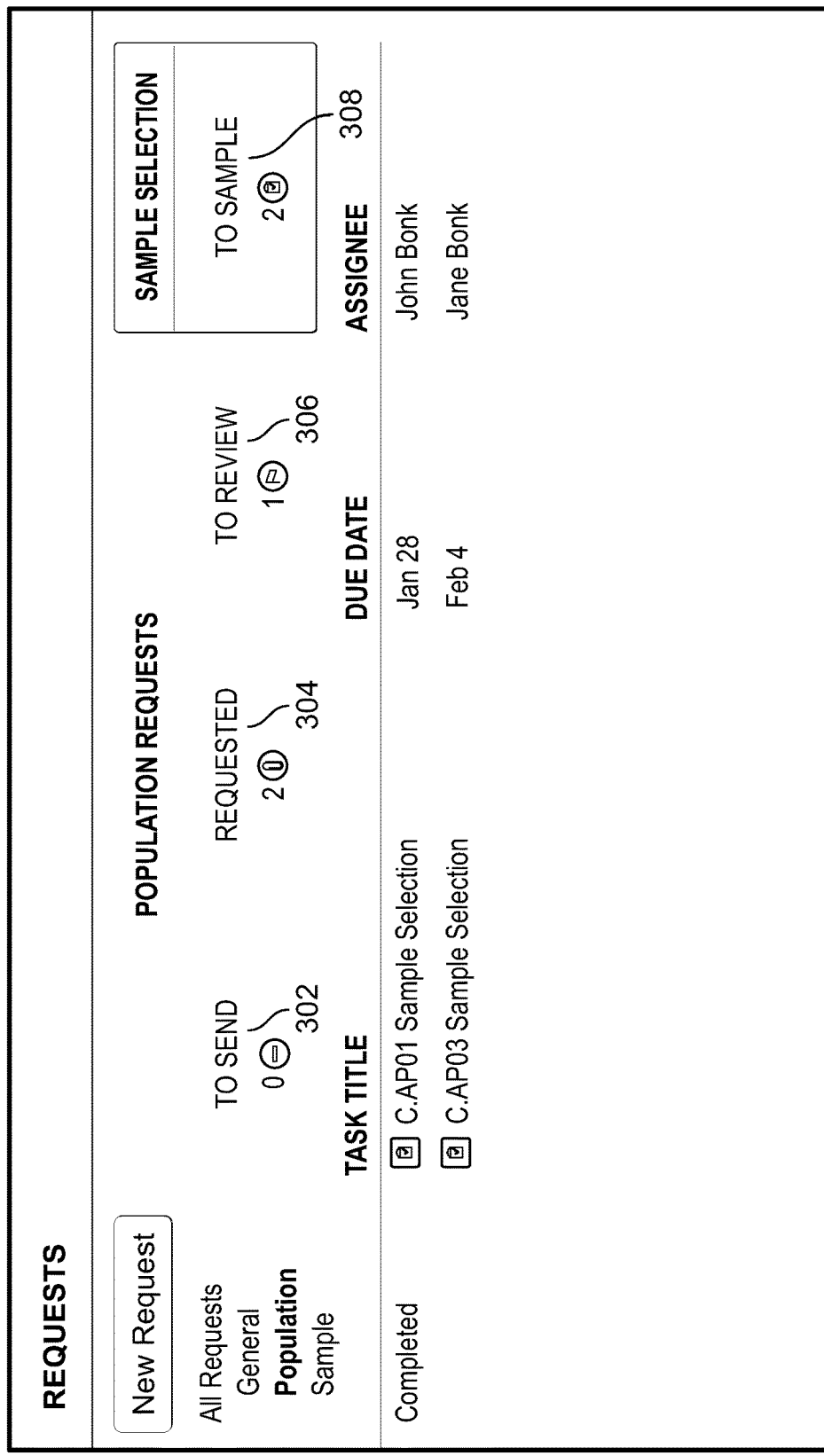

In an embodiment, if the requester 104b approves the population(s), then the productivity software 100a adds the tasks in the "To Sample" tab 308, as shown in FIG. 11. The requester 104b then selects the population that the requester 104b would like to sample-C.AP01 in this example- and the productivity software 100a reacts by displaying the interface 1200 shown in FIG. 12A, which depicts the contents of the csv file that the provider 106b provided, along with an entry field 1202 that allows the requester 104b to select how many randomly-chosen samples the requester 104b wants to take and a button 1204 to initiate the sampling process. In this example, it will be assumed that the requester 104b wishes to take 5 random samples. Upon initiating the sampling process (with the button 1204), the productivity software 100a randomly selects the five samples and displays them on the user interface 1200 as shown in FIG. 12B. The requester 104b is then given the option to finalize the selection.

According to an embodiment, each sample has multiple attributes associated with it, which, in this embodiment, are described in the column headings of the spreadsheet. For each given attribute of each given sample, there is a piece of data referred to as the "result." The grid that includes a given set of samples, attributes, and results is referred to as the "attribute matrix." Once it receives an entry of samples and attributes (or, alternatively, when the requester submits a request for the samples), the productivity software 100a generates a sample vertex 422 (FIG. 4B) for each sample (i.e., each row of the sampled subset of the spreadsheet received from the provider 106b). The sample vertex 422 includes the following properties: the name of the sample, a description of the sample, the location of the sample, and the batch from which the samples was taken. The productivity software 100a also generates: an edge 427 from the sample vertex 422 to the population vertex 414, an edge 425 from the sample vertex 422 to the file vertex 418 (i.e., the vertex corresponding to the separate document (e.g., spreadsheet) from which the sample was taken), an attribute matrix vertex 424 (FIG. 4A) (representing the attribute matrix), and an edge 432 from the sample vertex 422 to the attribute matrix vertex 424.

For each attribute of a set of samples received from a provider (or delegatee thereof), the productivity software 100a generates an attribute vertex 426 and an edge 430 from the attribute vertex 426 to the attribute matrix vertex 424. For each attribute/sample combination (e.g., each entry in the matrix), the productivity software 100a generates an attribute data vertex 433 (which has "result" as one of its properties), an edge 435 from the attribute data vertex 433 to the sample vertex 422, and an edge 437 from the attribute data vertex 433 to the attribute vertex 426 (FIG. 4A).

According to an embodiment, each step of a test to be performed on an evidence sample (also referred to herein as a "piece of evidence") is also represented in the graph database 112 by both an attribute vertex 426 and a test step vertex 442, with the attribute vertex being more representative of the display of the test step within the visual representation of the test matrix on the user interface and the test step vertex being more representative of the test step itself. Note that a "step" of a test will also be referred to herein generally as a "test," since each test "step" represents a test that is applied by to particular "attribute" of a piece of evidence. For each attribute vertex representing a test step, the productivity software 100a generates an edge 431 from the attribute vertex 426 (for that test step) to the test step vertex 442, but does not generate an edge from the attribute vertex 426 to the attribute matrix vertex 442 for test step attributes.

In an embodiment, the requester 104b may set up tests for the received samples by navigating to a test setup interface 1300, shown in FIG. 13A. The interface 1300 includes a visual representation 1302 of certain properties of the attribute matrix vertex 424. A test step and attributes entry interface 1304, shown in FIG. 13B (in a different portion of the interface 1300) allows the requester 104b to create test steps and attributes (i.e., test steps and sub-steps). In response to the entry of each test step, the productivity software 100a generates a test step vertex 442 and an edge 443 between the test step vertex 442 and the test of control vertex 404 that represents the particular test of control being carried out. In response to the entry of each attribute for a given test, the productivity software 100a generates an attribute vertex 426, an edge 430 between the attribute vertex 426 and the attribute matrix vertex 424, and an edge 431 between the attribute vertex 426 and the test step vertex 442 (corresponding to the test step to which the attribute belongs). The productivity software 100a adds the attribute tests to the visual representation 1302 of the attribute matrix, as shown in FIG. 13C.

In an embodiment, the productivity software 100a interprets the graph database 112 such that the productivity software 100a displays only those attributes (e.g., only those column headers in the incoming csv file) whose vertices have edges to the attribute matrix vertex 424 as part of the visual representation 1302. This allows for flexibility in the format and content of files provided by the provider. For example, three different providers might upload files having additional columns (i.e., additional to those columns that are needed to be displayed as part of the visual representation 1302). By restricting which attributes (e.g., which column headers) get edges generated to the attribute matrix vertex 424, the productivity software can ensure that only the relevant ones (e.g., the ones that need to be tested) are displayed.

According to an embodiment, the requester 104b may select (e.g., via a right-click menu on visual representation 1302) an option to create a request for the provider 106b to provide evidence (e.g., the samples themselves—the five checks in this example). The productivity software 100a responds by presenting a user interface 1400 (shown in FIG. 14), which includes fields 1402, 1404, and 1406 for the entry of the request title, due date, and provider (the provider 106b in this example) respectively. The interface 1400 also includes a file upload button 1408 that opens a file upload interface to allow, for example, the requester 104b to attach a sample file to give the provider 106b an idea of what sort of evidence is needed. Once the requester 104b is finished entering the information, the requester 104b selects the "Confirm Request" button 1410. The productivity software 100a reacts to this by creating a task proxy vertex 410 representing the request, creating a sample request vertex 450 representing the sample request, generating an edge 452 from the sample request vertex to the request vertex 408, generating an edge 423 between the request vertex 408 and the task proxy vertex 410 (FIG. 4B) and adding the task to the provider's queue 116. The productivity software 100a also generates a notification (e.g., as shown in FIG. 14) regarding the request (including the message entered by the requester 104b and a link to a portal such discussed above) and sends the notification (e.g., sends an email) to the provider 106b, which the provider 106b sees (on the third computing device 106). In response to the provider 106b selecting the link (once the portal opens) and the task representing the population request, the productivity software 100a displays a user interface 1500 that shows a more focused view of the task (FIG. 15).

In an embodiment, the provider 106b may then respond by locating files containing the requested evidence, uploading the files using an upload interface 1502, delegating this task by selecting the "Delegate Task" button 1504, or, once the files have been uploaded, submitting to the requester 104b for approval by selecting the "Submit for Approval" button 1506. There are many possible types of files that could contain the requested evidence, include word processing documents, spreadsheets, image files, video files, email files, and audio files. In this example, the provider 106b uploads an image of the front of each check listed and selects "Submit for Approval." The productivity software 100a responds by creating a file vertex 418 (FIG. 4B) for each image and generating an edge 454 from the sample request vertex 450 to the sample vertex 422 (i.e., the sample vertex corresponding to the entry for that check in the attribute matrix) and an edge 456 from the sample request vertex 450 to the file vertex 418. Thus, if the provider 106b uploads five image files (each with an image of a respective check), the productivity software 100a creates five file vertices 418. The productivity software 100a also adds a task to the queue 114 of the requester 104b (the task being to review the uploaded evidence).

Figure 17:

According to an embodiment, when the requester 104b opens the dashboard 300, the requester 104b will see the task on the "To Review Tab" 306, as shown in FIG. 16. When the requester 104b selects the task corresponding to the submission of evidence previously described (task 1602 of FIG. 16), the productivity software 100a responds by providing an interface 1700 (FIG. 17) that displays a list of the samples and the pieces of evidence provided in support thereof. The user interface 1700 includes a list 1702 of pieces of evidence (images of checks in this case) that have been received and are ready for testing. The requester 104b then may review the pieces of evidence (via selecting one of the icons 1704)

and mark them as approved or to be returned (e.g., in the column 1706) to the provider 106*b* if, for example, the checks do not match what was requested).

Figure 18A:
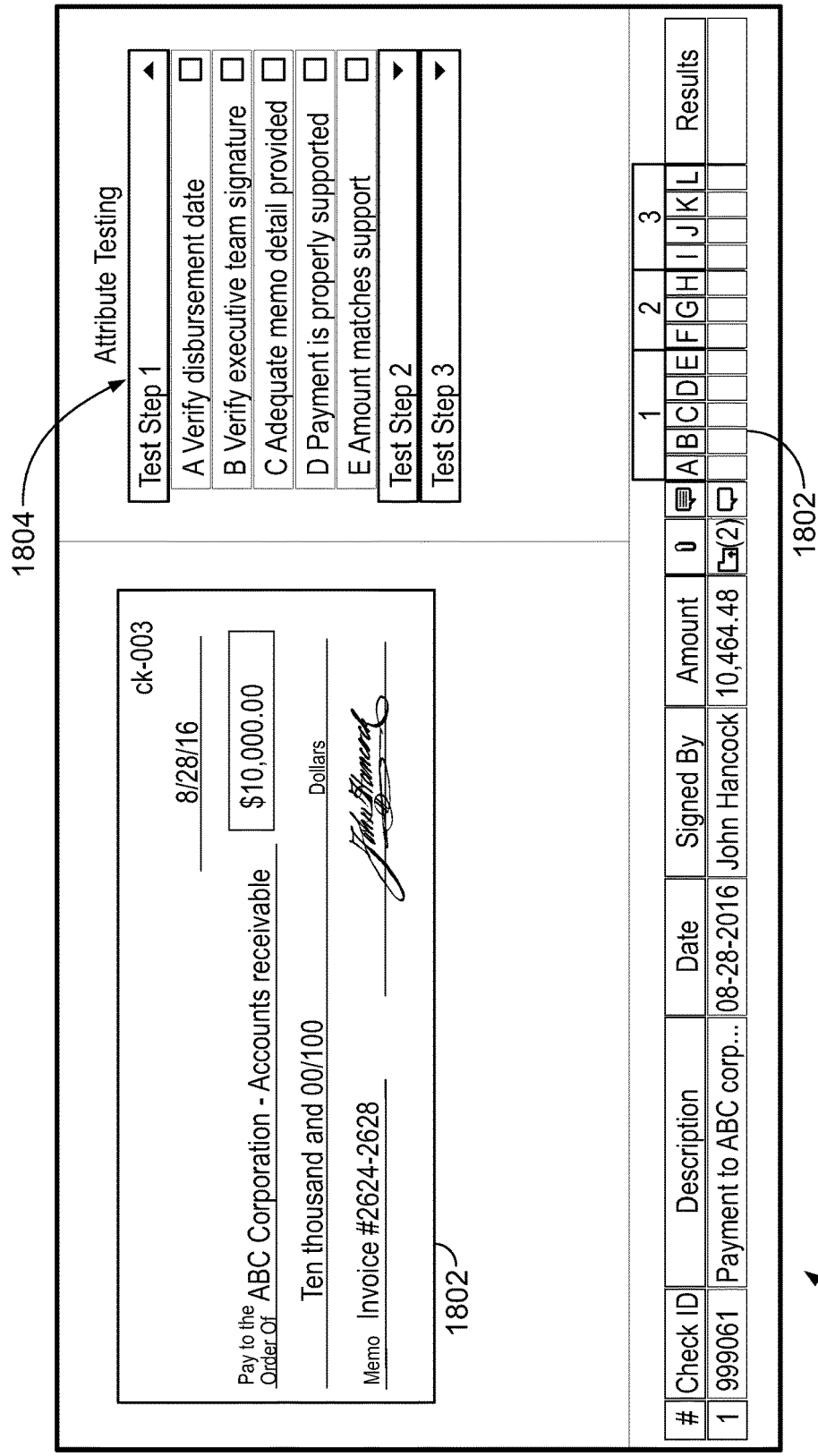

In an embodiment, when the requester 104*b* selects one of the icons of column 1704, the productivity software 100*a* responds providing a user interface 1800 that includes an image 1802 of file (check, in this example) as shown in FIG. 18A, along with a list 1804 of test steps and attribute tests. In this context, the attribute tests are sub-steps of the overall test step. A given test step may have one or more attribute tests. Next to each attribute test is a check box, in which the requester 104*b* may indicate whether the test of an attribute passed, failed, or is not applicable. The attributes in the list 1804 are the same ones shown on the visual representation 1302 of the attribute matrix and stored in the database 112 in the vertices discussed previously.

Figure 18B:
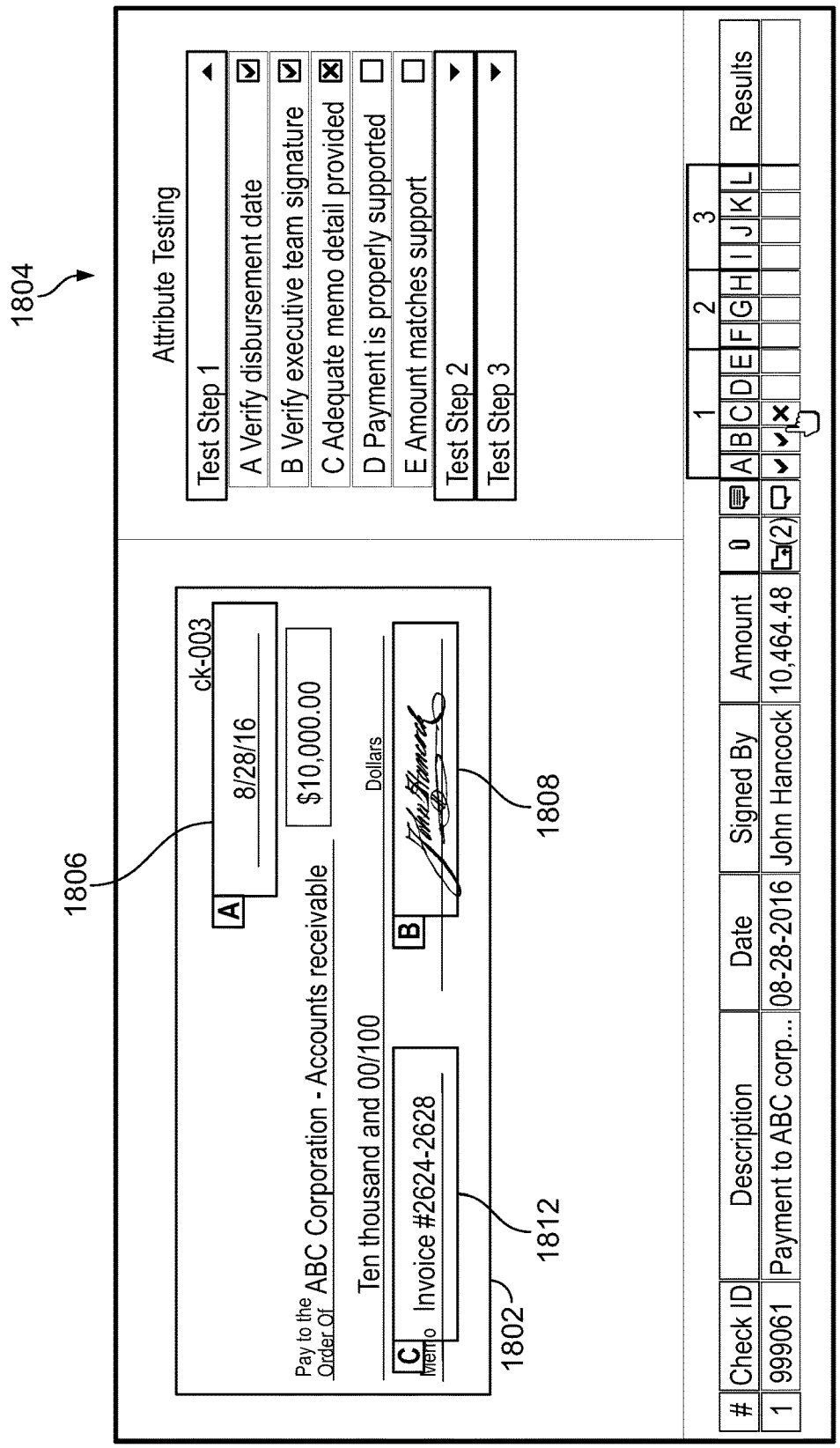

In an embodiment, the requester 104*b* can interact with the user interface 1800 (e.g., drag and drop) to apply a step of a test to the appropriate part of the image 1802 so as to create a visual indicator such as a markup at a particular location on the image 1802 (as displayed on the user interface 1800) and indicate the result of the test step at that location via the visual indicator. For example, assume that the requester 104*b* drags test step 1A, "Verify Disbursement Date" over to the date on the check image 1802 and, through a pop-up menu (e.g., activated by a "right click" gesture), indicates that the particular attribute being tested (the disbursement date) has "passed." The productivity software 100*a* reacts by displaying a markup 1806, as shown in FIG. 18B (a green rectangle, in this case), at the target area of the drag and drop gesture (e.g., on a portion of the image 1802). In some embodiments, the user interface 1800 permits a user to select the shape (e.g., rectangle, square, teardrop) and/or color of the markup (e.g., green for pass, red for fail) that is to be applied to the evidence. In others, there are no choices for the shape or the color (e.g., the color is dictated by the representative icon or markup to be used such as pass=green, fail=red). Furthermore, the productivity software 100*a* reacts to this drag-and-drop gesture by creating the markup vertex 412 (FIG. 4B) and generating an edge 434 from the markup vertex 412 to the file vertex 418 representing the file containing the image 1802.

According to an embodiment, the productivity software 100*a* also updates a visual representation 1810 of the matrix to indicate whether the evidence has passed the attribute test (e.g., green check mark for "pass" and red X for "fail") as shown, for example, in FIG. 18B. The requester 104*b* can repeat this process for other attributes so as to test, for example, the signature and memo fields resulting in a green rectangle markup 1808 (indicating that the signature "passes") and a red rectangle markup 1812 (indicating that the memo field "fails"). As the results of the tests results are entered by the requester 104*b*, the productivity software 100*a* updates the graph database 112 by generating additional markup vertices 412 (e.g., one markup vertex per markup) and generating an edge 434 from them to the file vertex 418 of that image.

In an embodiment, the requester 104*b* indicates whether the overall test step passes or fails by annotating the check box next to the attribute in the list 1804. The productivity software 100*a* indicates the pass or fail status even if not all of the tests of the individual attributes have the same result. The productivity software 100*a* represents the overall pass or fail status in the "result" property of the attribute data vertex 433. Furthermore, the requester 104*b* can enter a footnote to, for example, explain the result of the test. The productivity software 100*a* responds by creating a footnote vertex 458 in the graph database 112 and generating a vertex 460 from the attribute data vertex 433 to the footnote vertex 458.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

Also, other implementations of the various user interfaces shown herein may be used without departing from the scope and spirit of the disclosure. For example, the user interface 1800 of FIGS. 18A and 18B may, instead of check boxes, provide a button that visually indicates the current result but brings up a dropdown menu when a user selects the button. The dropdown menu can include choices like "pass," "fail," "not reviewed," or "N/A." Similarly, the user interface 1800 may, instead of creating a rectangle when an attribute is dragged onto the displayed sample (the displayed evidence), display a different shape, such as a teardrop shape.

What is claimed is:

1. A system for facilitating the review of the content of a document, the system comprising:
 a first computing device operating as a server; and
 a second computing device operating as a client of the first computing device,
 wherein the second computing device transmits a file containing a plurality of attributes,
 wherein the first computing device:
  receives the file containing a plurality of attributes;
  generates, in a graph database, a vertex representing an attribute matrix;
  for each of a first subset of the plurality of attributes,
   generates, in the graph database, a vertex representing the attribute,
   generates an edge between the vertex representing the attribute and the vertex representing the attribute matrix;
  for each of a second subset of the plurality of attributes,
   generates, in the graph database, a vertex representing the attribute,
   refrains from generating an edge between the vertex representing the attribute and the vertex representing the attribute matrix;
  provides a user interface to the second computing device;
 wherein the second computing device:
  displays a visual representation of the attribute matrix on the user interface using only those attributes of the first subset;
  visually renders a document on the user interface;
  detects a user interaction with the document as rendered on the user interface, wherein the user interaction includes an entry of a markup to be applied to the rendered document and an input of data regarding an attribute of the first subset of attributes;
  provides information regarding the entry of the markup to the first computing device;
 wherein the first computing device:
  generates, in the graph database, a vertex representing the markup, generates, in the graph database, an edge from the vertex representing the markup to a vertex representing the document; and updates, in the graph database, a vertex representing the attribute of the first subset of attributes with the data regarding the attribute of the first subset of attributes.

2. The system of claim 1, wherein the second computing device detects the user interaction by receiving an input of a drag and drop gesture on the visual representation of the attribute matrix via the user interface.

3. The system of claim 1, wherein the entry of the markup comprises a selection of a geometric shape to be applied to the visual rendition of the document.

4. The system of claim 1, wherein the second computing device receives a user selection of a color to be applied to the markup.

5. The system of claim 1, wherein the first computing device:
   generates a vertex representing a file containing the document;
   generates an edge between the vertex representing the markup and the vertex representing the file containing the document; and
   generates an edge between the vertex representing the file containing the document and the vertex representing the document.

6. The system of claim 1,
   wherein the second computing device detects the user interaction with the document as rendered on the user interface by detecting the user interaction at a first location on the document,
   wherein the entry of the markup comprises an entry of the markup at the first location,
   wherein the second computing device:
      detects a second user interaction with the rendered document at a second location on the document,
      wherein the second user interaction includes an entry of a second markup to be applied to the rendered document and an input of data regarding a second attribute of the first subset of attributes;
   wherein the first computing device:
      generates, in the graph database, a vertex representing the second markup; and
      generates, in the graph database, an edge from the vertex representing the second markup to the vertex representing the document.

7. The system of claim 1, wherein the first computing device:
   transmits a message to a second user, wherein the message includes a link to an upload user interface; and
   receives the file containing the document via the upload user interface.

* * * * *

UNITED STATES PATENT AND TRADEMARK OFFICE
CERTIFICATE OF CORRECTION

PATENT NO. : 10,216,706 B1
APPLICATION NO. : 15/681960
DATED : February 26, 2019
INVENTOR(S) : Bonk et al.

Page 1 of 1

It is certified that error appears in the above-identified patent and that said Letters Patent is hereby corrected as shown below:

On the Title Page

Item (72) Inventor is corrected to read:
-- John Bonk, Ann Arbor (MI);
Ryan Gilsdorf, Des Moines (IA);
James Michael Morse, Adel (IA);
Jason Aguilon, Louisville (CO);
David Andrew Haila, Ames (IA);
Matthew Sanders, Highlands Ranch (CO);
Patrick Corwin Kujawa, Missoula (MT);
Robert Reed Becker, Missoula (MT);
Sean Martin Kelly Burke, Missoula (MT);
Stephen Bush, Missoula (MT);
Thomas Ryan Connell, Missoula (MT) --.

Signed and Sealed this
Fourteenth Day of April, 2020

Andrei Iancu
*Director of the United States Patent and Trademark Office*